United States Patent [19]
Baxter et al.

[11] Patent Number: 5,335,624
[45] Date of Patent: Aug. 9, 1994

[54] FEED AND DRINK FEEDER

[75] Inventors: Michael R. Baxter, Isleworth, England; James M. Bruce, Ellon, Scotland

[73] Assignee: ACO Severin Ahlmann GmbH & Co. KG, Rendsburg, Fed. Rep. of Germany

[21] Appl. No.: 9,307

[22] Filed: Jan. 22, 1993

[51] Int. Cl.$^5$ ............................ A01K 5/01; A01K 7/02
[52] U.S. Cl. ................................. 119/51.5; 119/52.4; 119/61
[58] Field of Search ................. 119/61, 52.1, 52.4, 119/51.5, 78, 75

[56] References Cited

U.S. PATENT DOCUMENTS

| | | | |
|---|---|---|---|
| 1,737,797 | 12/1929 | Jacot | 119/61 |
| 2,191,811 | 2/1940 | Trampier, Sr. | 119/61 |
| 2,419,834 | 4/1947 | Grindstaff | 119/51.5 |
| 3,340,851 | 9/1967 | Frank et al. | 119/75 |
| 3,730,141 | 5/1973 | Manning et al. | 119/51.5 |
| 3,782,332 | 1/1974 | Depenthal et al. | 119/51.13 |
| 3,952,706 | 4/1976 | Hart | 119/75 |
| 4,029,051 | 6/1977 | McKinney | 119/52.4 |
| 4,192,256 | 3/1980 | Clugston | 119/51.5 |
| 4,357,905 | 11/1982 | Carpenter | 119/61 |
| 4,860,691 | 8/1989 | Mayer | 119/51.5 |
| 4,947,796 | 8/1990 | Robinette | 119/61 |

FOREIGN PATENT DOCUMENTS

| | | | |
|---|---|---|---|
| 0206636 | 9/1990 | European Pat. Off. | |
| 1164479 | 10/1975 | France | 119/51.5 |
| 447720 | 4/1949 | Italy | 119/78 |
| 8911790 | 12/1989 | PCT Int'l Appl. | 119/52.1 |
| 2059240 | 4/1981 | United Kingdom | 119/52.1 |

Primary Examiner—Gene Mancene
Assistant Examiner—Todd E. Manahan
Attorney, Agent, or Firm—Rosen, Dainow & Jacobs

[57] ABSTRACT

Feeding trough for a group of animals intended for slaughter and having a size variation within a predetermined range comprises separate food and water compartments positioned at horizontally spaced apart locations within the feeding trough, A front wall is provided over which the animal's head can reach into the compartments. The trough has an access opening above the front wall through which the head of the animal reaches. A hopper is provided for supplying feed to the food compartment to a predetermined depth. The access opening is dimensioned so that only one animal can reach into the compartments at a time, The food and water compartments are positioned within the feeding trough and have shapes configured so that the animal when positioned with its head in the feeding trough can move between the food and water compartments by turning its head laterally without needing to back out of the feeding trough.

11 Claims, 3 Drawing Sheets

FEED AND DRINK FEEDER

BACKGROUND OF THE INVENTION

1. Field of the Invention

This invention relates to feeding troughs for animals and in particular to troughs which are designed to stimulate the appetite of a group of animals intended for slaughter, and which deliver a supply of water and food to animals, for example pigs.

A problem with conventional feeding troughs is that not all of the food and water mixed by the animal is eaten. Some moist food remains in the feeder and can accumulate in inaccessible corners. As moist food promotes the growth of pathogens, this is unhygienic.

2. Description of the Related Art

One conventional type of prior art feeding trough for animals, commonly known as the "shelf-feeder", is described in European patent specification 206636B1. In this feeder, the feed is supplied by means of a hopper to a shelf positioned at a relatively high level in relation to the base of the trough. The shelf is directly accessible by the head of the animal for direct feeding therefrom. Food can be dislodged from the shelf by the animal so as to fall into the base of the trough into the vicinity of a water dispensing nozzle actuable by the animal. The animal can therefore mix the feed with the water if desired. This arrangement suffers from the problem that moist feed usually remains in the trough after feeding.

The animal actuable nozzle can be overused by the animal. Some animals, in particular pigs, play with such actuable devices. This can lead to an excessive flow of water into the feeder.

Another problem with conventional feeders is maintaining a regular supply of feed and water to the feeder. Feeders which have manually adjustable devices for controlling the flow of water and feed are not popular with farmers because farmers do not wish to spend time monitoring and making regular adjustments of the feeders.

SUMMARY OF THE INVENTION

It is an aim of the present invention to provide a feeding trough which can provide a regular and controlled supply of water and food in such a manner as to stimulate the appetite of growing animals intended for slaughter, while avoiding the possibility of moist feed being allowed to accumulate in the feeder.

According to the present invention, there is provided a feeding trough for a group of animals intended for slaughter and having a size variation within a predetermined range, the feeding trough comprising: separate food and water compartments positioned at horizontally spaced apart locations within the feeding trough; a front wall over which the animal's head can reach into the compartments; an access opening, above the front wall through which the head reaches; and a hopper for supplying feed to the food compartment to a predetermined depth; wherein the access opening is dimensioned so that only one animal intended to feed from the feeding trough can reach into the compartments at a time, and the food and water compartments are positioned within the feeding trough and have shapes configured so that the animal when positioned with its head in the feeder can move between the food and water compartments by turning its head laterally without needing to back out of the feeder.

Embodiments of the invention have the advantage that owing to the lateral separation of the water and food compartments, the animal is unable to dislodge feed so that it falls into the water compartment, or conversely the animal cannot cause water to be dispensed onto the feed in the feed compartment. This eliminates the problem of pathogens accumulating owing to moist feed remaining in the feed for long periods of time.

The food and water compartments are positioned and configured, in embodiments of the invention, so that the animal can gain access to either one of them simply by turning its head laterally without the need to move its entire body into or out of the feeder. This enables the animal to consume water and feed from the compartments alternately thereby allowing mixing of the feed with the water after the feed has been taken from the trough. That is to say, the feed from is mixed with the water in the animal rather than in the trough itself. This arrangement also reduces the chance of feed being lost on account of the animal moving into and out of the feeder during feeding.

In a preferred embodiment of the invention, an intermediate wall is provided between the water and feed compartments for preventing splashes of water entering the food compartment. Preventing water entering the food compartment also has the advantage of preventing the hopper itself from becoming clogged.

In the preferred embodiment, the wall is sufficiently low enough at the access opening end of the trough to permit the animal to turn its head into both bowls, but high enough at the rear to prevent the water from being splashed from the water compartment into the food compartment.

The food and water compartments of embodiments of the invention are positioned so that the animal does not have the opportunity to mix the food before ingestion but can take water and food from the feeder in a desired ratio.

BRIEF DESCRIPTION OF THE DRAWINGS

The invention will now be further described by way of example with reference to the accompanying drawings, in which.

DESCRIPTION OF THE PREFERRED EMBODIMENTS

Figure 1:
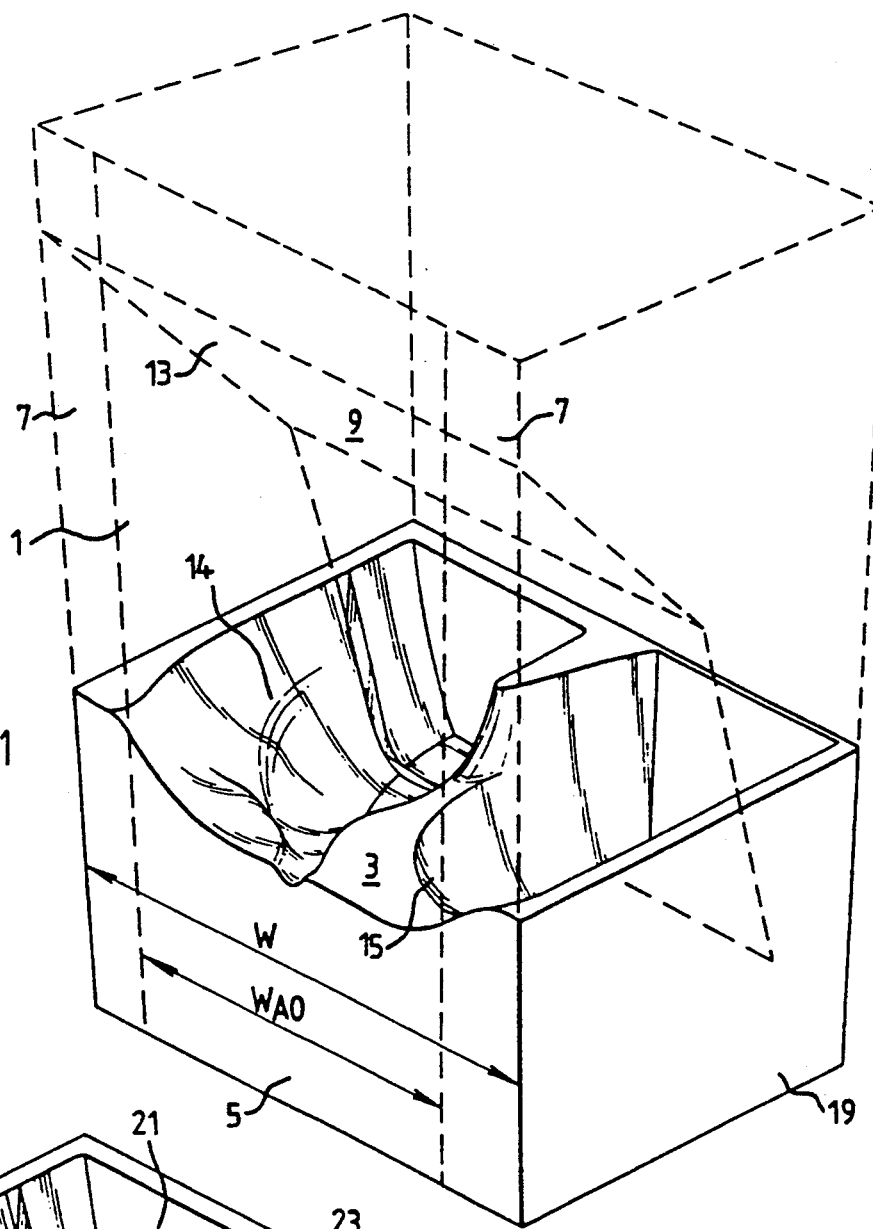
FIG. 1 is a perspective view, showing some hidden detail, of a preferred embodiment of the invention.

FIG. 1 shows a feeding trough of a preferred embodiment of the invention having an overall width W which is greater than the width $W_{AO}$ of an access opening 1. The access opening 1 is sufficiently large to accommodate the head of an animal intended to feed from the feeding trough.

The lower portion of the feeding trough is provided with a base section 3 having a front wall 5 over which the head of the animal reaches when feeding from the trough. The base section 3 is described in more detail with reference to FIG. 2.

The width $W_{AO}$ of the access opening 1 is sufficiently wide to enable access by the animal having the largest shoulder width of the group, while being sufficiently narrow to prevent more than one animal gaining access to the feeding trough at a time. Side panels 7 are provided for reducing the overall width of the trough while leaving the internal width equal to W.

A hopper 9 comprising a lower rear wall portion 11 and a canopy portion 13 is provided in the feeding trough for permitting feed to accumulate in a feed compartment up to a predetermined height. An agitator 17 (see FIG. 6) which can be actuated by the snout of the animal is optionally provided in the hopper for enabling the animal to cause more feed to drop from the hopper and into the food compartment up to the predetermined height as desired.

The angular and dimensional positioning of the base section 3, the side panels 7, the lower rear wall portion 11, the canopy 13, water and feed compartments 14, 15 are configured so as to accommodate the animal's head in such a manner so as to allow the animal to gain access to the water and feed compartments 14 and 15 alternately as desired simply by turning the head laterally rather than needing to move the body of the animal into or out of the feeding trough.

Several feeding troughs such as the one illustrated in FIG. 1 can be positioned side by side for feeding a corresponding number of animals. The feeding troughs are separated by vertical partitions 19, forming the sides of the feeding troughs, these partitions extending for the full height and depth of the trough. This is to encourage the animal to stand substantially perpendicular to the access opening 1 thereby discouraging any animal to obstruct the access to an adjacent feeding trough.

Figure 2:
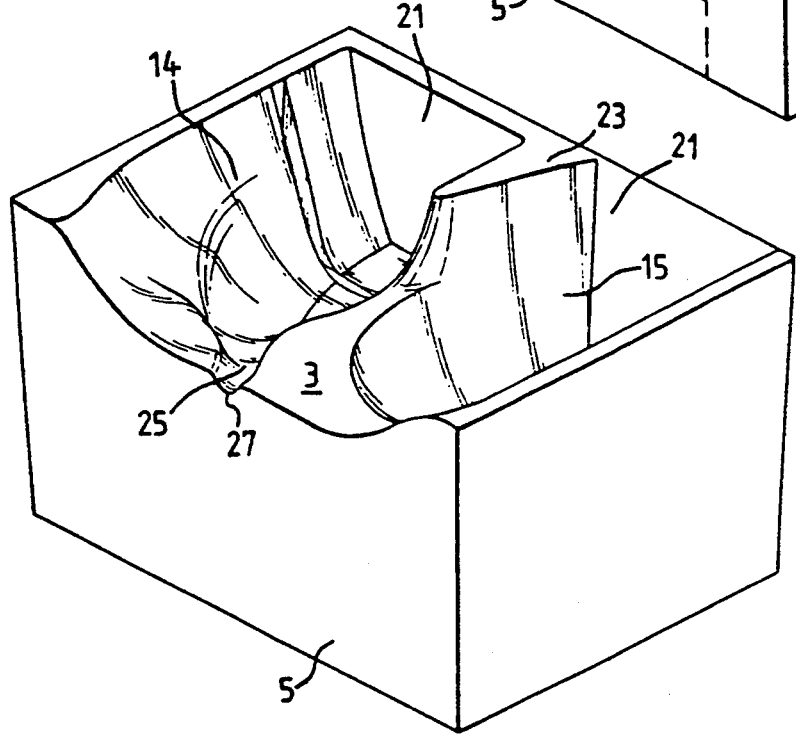
FIG. 2 is a perspective view of a base section of the preferred embodiment.

FIG. 2 is a perspective view of the base section 3 showing the contouring of the water and feeding compartments 14 and 15.

As can be seen from FIG. 2, the water and feed compartments 14, 15 are generally bowl shaped and have a rear wall 21 with a much steeper slope than any other wall of the compartment. The water and feed compartments 14 and 15 are contoured so that on the one hand the animal's head can easily gain access to either one of them by simply turning its head laterally, and on the other hand avoiding the possibility of feed, particularly feed which may have become moist by mixing with the water, from accumulating in inaccessible corners of the feeding trough.

The water and feed compartments 14, 15 are separated by a partition wall 23 which is higher towards the rear of the base section than towards the front wall 5. This is to assist in the prevention of water from splashing out of the water compartment 14 and into the feed compartment 15.

A drain gulley 25 is formed in the front wall 5 of the water compartment 14 and has an outlet 27 positioned along the width of the front wall 5 corresponding to the position of the partition wall 23. The drain gulley 25 acts as an overflow for the water compartment 14 and permits draining of water onto the feet of the animal feeding from the trough.

Figure 3:
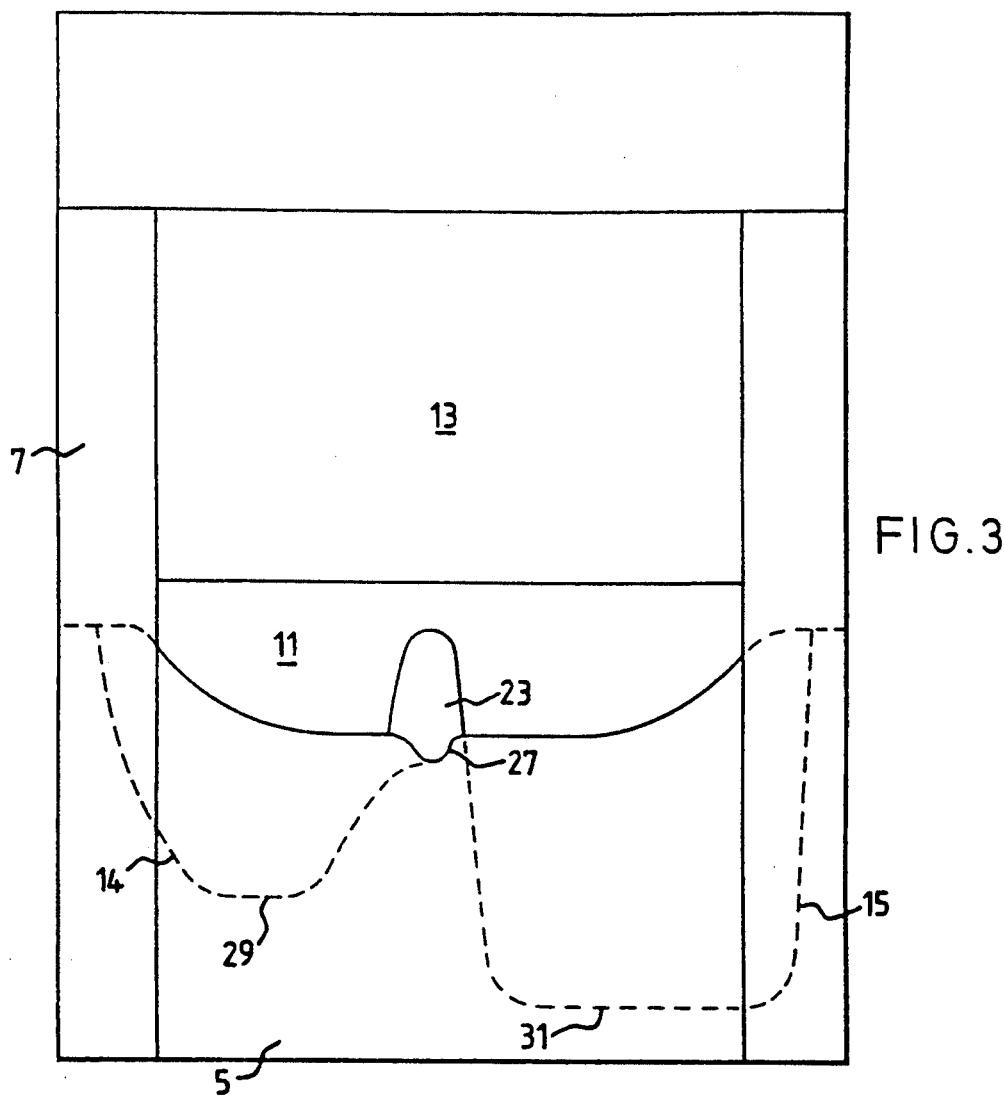
FIG. 3 is a front elevational view of the feeding trough of FIG. 1.

FIG. 3 is a front elevational view of the embodiment and shows the relative vertical positioning between the water and food compartments 14, 15.

The water compartment 14 has a base 29 which is higher than the base 31 of the food compartment 15.

The contouring and size of the water compartment 14 is such as to accommodate the snout of the animal, while the contouring and size of the food compartment 15 is sufficiently large to accommodate the head of the animal.

The supply and level of water to the water compartment 14 can be controlled by a drink mechanism i.e. liquid dispensing means 33 which may be in the form of a float valve or an animal actuated nipple device. Such a mechanism helps to ensure that the water level in the water compartment 14 is maintained at a constant predetermined level.

It is possible that some feed may drop into the water compartment 14, this being transferred by the snout of the animal. This will give rise to the accumulation of some sediment so it is desirable that the depth of the water be sufficiently shallow for the animal to consume this while drinking. The depth of the water is therefore sufficient to permit the animal to drink by sucking and not lapping the water but is shallow enough so that the animal will consume at least some of any sediment which may accumulate at the bottom of the water compartment 14.

The drain overflow 25 ensures that water does not flood into the food compartment 15 and also prevents the water from becoming too deep in the water compartment 14 thereby avoiding any risk that the animal may tend to blow bubbles and splash water into the feed compartment 15.

A manually openable and closeable drain 35 may be provided at the bottom of the water compartment 14 which the farmer can operate if it is desired to drain and flush the water compartment 14. There may be similar provision in the food compartment 15 for cleaning purposes.

It is important to note that embodiments of the invention are intended for self-help feeders where feed is supplied by means of a hopper and water is provided at a constant depth. It is intended that these feeders are used for growing animals for slaughter.

The relative dimensions of the access opening 1, rear wall portion 11, canopy 13, front wall 5 are such that the feeding trough is suitable for access by a predetermined group of animals. These dimensions may be governed by the criteria set out in PCT patent specification number WO 89/11790.

Figure 4:
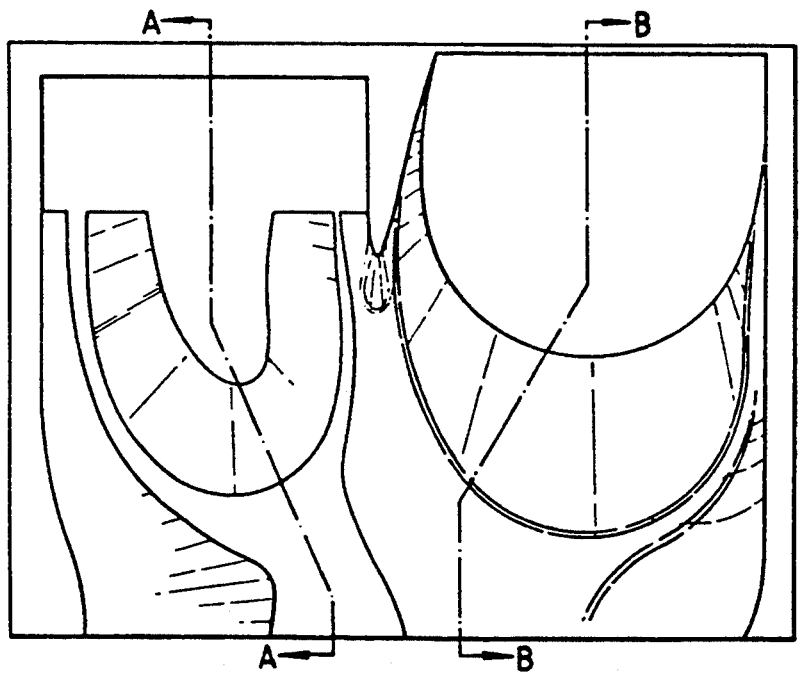
FIG. 4 is a plan view showing contouring of the base section of FIG. 2.

FIG. 4 illustrates, in plan, the contours of the base section 3. As can be seen from FIG. 4, the contours of the water and food compartments 14, 15 are such as to ensure ease of access to the compartments by a single animal without the need for the animal to twist, access being gained by the animal simply turning its head.

Figure 5:
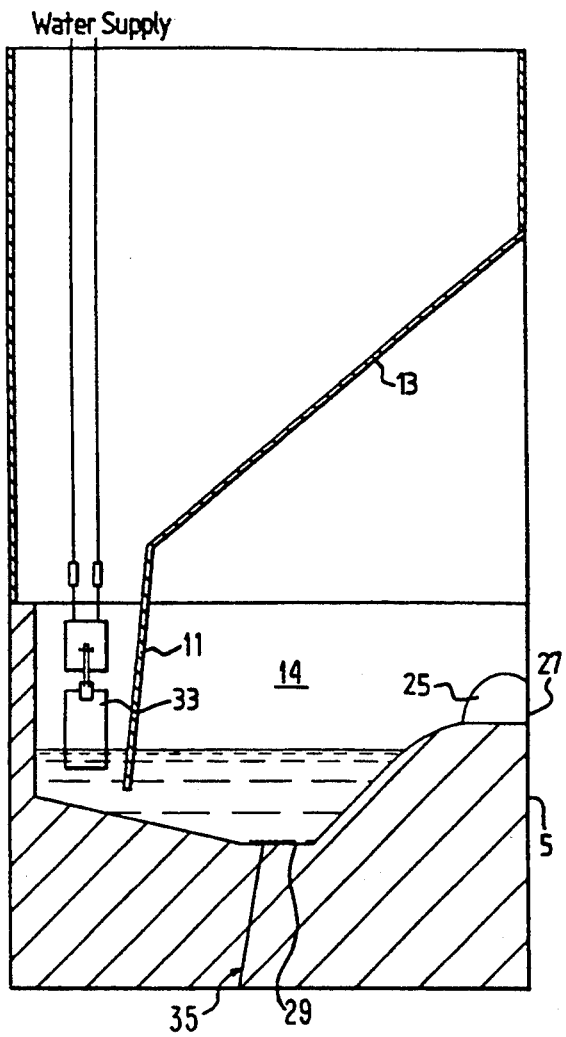
FIG. 5 is a sectional view along lines A—A of a water compartment of FIG. 4.

FIG. 5 is a sectional view along the lines A—A of FIG. 4 and contains a schematic illustration of the float mechanism 33 for controlling the level of water within the water compartment 14.

Figure 6:
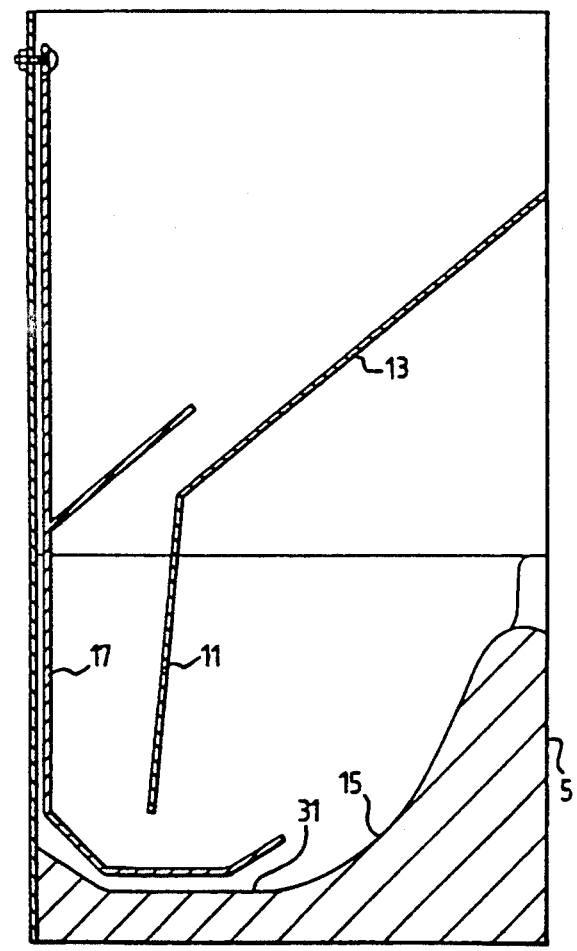
FIG. 6 is a sectional view of the food compartment taken along line B—B of FIG. 4.

FIG. 6 is a sectional view along the lines B—B of FIG. 4 and illustrates the agitator 17 which can be actuated by the snout of the animal.

We claim:

1. A feeding trough for a group of animals intended for slaughter and having a size variation within a predetermined range, the feeding trough comprising separate food and water compartments positioned at horizontally spaced apart locations within the feeding trough; a front wall over which the animal's head can reach into the compartments; an access opening above the front wall through which the head reaches; a hopper for supplying feed to the food compartment to a predetermined depth; wherein the access opening is dimensioned so that only one animal intended to feed from the feeding trough can reach into the compartments at a time, and the food and water compartments are positioned within the feeding trough and have shapes configured so that the animal when positioned with its head in the feeding trough can move between the food and water compartments by turning its head laterally without needing to back out of the feeding trough; and a partition wall for separating the food and water compartments for preventing splashes of water entering the food compartment from the water compartment, the partition wall being higher towards the feeding trough, away from the access opening, than it is at the access opening.

2. A feeding trough according to claim 1 wherein the water compartment is provided with an overflow drain for draining the water out of the feeding trough when the level of the water reaches a predetermined level.

3. A feeding trough according to claim 2, wherein the drain is a gully arranged for discharging overflow water from the front wall of the trough.

4. A feeding trough according to claim 3, wherein the gully leads out of the trough to a point along the front wall adjacent the partition wall, whereby water flowing from the feeding trough by way of the gully can drain onto the animal's feet.

5. A feeding trough according to claim 1 wherein the water compartment is shallower than the food compartment, the water compartment being sufficiently shallow whereby the animal intended to drink therefrom can take in at least some food sediment which might have accumulated on the floor of the water compartment.

6. A feeding trough according to claim 1, wherein a liquid dispensing means governs the depth of refilling of the water compartment.

7. A feeding trough according to claim 1, wherein the water compartment has a floor and a manually openable and closeable drain in the floor.

8. A feeding trough according to claim 1, wherein at least the food and water compartments are cast polymer concrete.

9. A feeding trough according to claim 1, wherein the water compartment has a volume substantially corresponding to the size of the snout of the animal intended to drink therefrom, and the food compartment has a volume substantially corresponding to the size of the head of the animal.

10. A feeding trough for a group of animals intended for slaughter and having a size variation within a predetermined range, the feeding trough comprising separate food and water compartments positioned at horizontally spaced apart locations within the feeding trough; a front wall over which the animal's head can reach into the compartments; an access opening above the front wall through which the head reaches; and a hopper for supplying feed to the food compartment to a predetermined depth; wherein the access opening is dimensioned so that only one animal intended to feed from the feeding trough can reach into the compartments at a time, the food and water compartments are positioned within the feeding trough and have shapes configured so that the animal when positioned with its head in the feeding trough can move between the food and water compartments by turning its head laterally without needing to back out of the feeding trough, and the food compartment and the water compartment each have a floor, the floor of the water compartment being higher than the floor of the food compartment.

11. A feeding trough for a group of animals intended for slaughter and having a size variation within a predetermined range, the feeding trough comprising separate food and water compartments positioned at horizontally spaced apart locations within the feeding trough; a front wall over which the animal's head can reach into the compartments; an access opening above the front wall through which the head reaches; and a hopper for supplying feed to the food compartment to a predetermined depth; wherein the access opening is dimensioned so that only one animal intended to feed from the feeding trough can reach into the compartments at a time, the food and water compartments are positioned within the feeding trough and have shapes configured so that the animal when positioned with its head in the feeding trough can move between the food and water compartments by turning its head laterally without needing to back out of the feeding trough, and the water compartment is substantially bowl shaped, having a rear side wall facing the front wall which is sloped more steeply than the remaining walls of the water compartment.

* * * * *

UNITED STATES PATENT AND TRADEMARK OFFICE
CERTIFICATE OF CORRECTION

PATENT NO. : 5,335,624
DATED : August 9, 1994
INVENTOR(S) : Michael R. Baxter, Isleworth, England
James M. Bruce, Ellon, Scotland It is certified that error appears in the above-indentified patent and that said Letters Patent is hereby corrected as shown below:

On the title page, after "[22] Filed: January 22, 1993" add —[30] Foreign Application Priority Data January 22, 1992 [GB] United Kingdom 9201380.4—

Signed and Sealed this

Twenty-fourth Day of January, 1995

Attest:

BRUCE LEHMAN

*Attesting Officer*    *Commissioner of Patents and Trademarks*